United States Patent [19]

Ueda et al.

[11] Patent Number: 4,652,511

[45] Date of Patent: Mar. 24, 1987

[54] PROCESS FOR PRODUCING RESIN COMPOSITION USEFUL AS ELECTROPHOTOGRAHIC TONER

[75] Inventors: Hikoji Ueda; Akira Otsu; Kenji Sano; Katuyuki Takano, all of Tokyo, Japan

[73] Assignee: Fujikura Kasei Co., Ltd., Tokyo, Japan

[21] Appl. No.: 725,201

[22] Filed: Apr. 19, 1985

[51] Int. Cl.$^4$ .................. G03G 9/08; C08L 29/04; C08F 4/00
[52] U.S. Cl. ............................... 430/137; 525/57; 525/59; 525/252; 525/253; 525/258; 525/259; 525/283; 525/279; 525/285; 525/296; 525/300; 525/301; 525/309; 525/310; 525/312; 525/317; 525/319; 525/322; 525/324
[58] Field of Search .................. 430/137; 525/57, 59, 525/252, 253, 258, 259

[56] References Cited

U.S. PATENT DOCUMENTS 4,246,332  1/1981  Tanaka et al. ................ 430/109
4,486,524  12/1984  Fujisaki et al. .............. 430/109

FOREIGN PATENT DOCUMENTS 2123173  11/1972  Fed. Rep. of Germany ...... 525/253
57-114150  7/1982  Japan ............................. 430/137
59-62868   4/1984  Japan ............................. 430/137
60-57854   4/1985  Japan ............................. 430/137

*Primary Examiner*—Roland E. Martin
*Attorney, Agent, or Firm*—Wenderoth, Lind & Ponack

[57] ABSTRACT

A process for producing a resin composition which comprises suspension-polymerizing at least one vinyl monomer in an aqueous medium in the presence of a dispersing agent, said suspension polymerization being carried out using a nonionic dispersant as said dispersing agent in the presence of a high-molecular-weight vinyl polymer having a weight average molecular weight of at least 500,000 obtained by emulsion polymerization.

6 Claims, No Drawings

PROCESS FOR PRODUCING RESIN COMPOSITION USEFUL AS ELECTROPHOTOGRAHIC TONER

This invention relates to a process for producing a resin composition suitable for use as a toner for developing a latent electrostatic image in electrophotography.

In electrophotography, a hot roller fixing method has been in widespread use which comprises permanently fixing a toner image to an image-receiving sheet by heat fusion using hot rollers. Since the image-bearing surface of the image-receiving sheet comes into press contact with the surface of the hot rollers in this method, the thermal efficiency during the heat fusion is excellent and the fixation of the toner image can be effected rapidly. These advantages make the hot roller fixing method very suitable for use in elecrophotograpic copying machines.

Toners which can be suitably used in the hot roller fixing method are required to soften at relatively low temperatures and adhere accurately to the image-receiving sheet (to have excellent fixability) and not to adhere to the hot rollers even when the temperature of the hot rollers is relatively high (to have non-offset property). To meet these requirements, it is considered desirable to use a mixture of a low-molecular-weight polymer having excellent fixability and a high-molecular-weight polymer having excellent non-offset property as a toner resin. The use of such a toner resin is disclosed, for example, in U.S. Pat. Nos. 4,486,524 and 4,246,332 and Japanese Laid-Open Patent Publication No. 86558/1983.

Various methods have previously been proposed for mixing the low-molecular-weight polymer and the high-molecular-weight polymer. All of them, however, have defects and are desired to be improved.

(1) There was, for example, proposed a method which comprises dissolving the low-molecular-weight polymer and the high-molecular-weight polymer in separate solvents, mixing the resulting solutions and thereafter drying the mixture by vacuum drying, spray drying, etc. to remove the solvents. Since this method requires extra steps of dissolving the polymers in solvents and removing the solvents from the resulting mixture, the cost of production becomes high. Furthermore, when the two polymers differ greatly in molecular weight, there is also a marked difference between the two polymers in solvent solubility. It is particularly difficult to produce a solution of the high-molecular-weight polymer in a high concentration. This brings about the effect that a mixed polymer of sufficient uniformity is difficult to obtain at arbitrary mixing ratios.

(2) There was also proposed a method which comprises heating the low-molecular-weight polymer and the high-molecular-weight polymer to temperatures above the softening points of these polymers and then kneading them in the molten state. This method also requires an extra step of heating the polymers, and where there is a marked difference between the softening points of the two polymers, it is difficult to mix them uniformly.

(3) The above-cited U.S. Pat. Nos. 4,486,524 and 4,246,332 and Japanese Laid-Open Patent Publication No. 86558/1983 disclose a method which comprises producing a low-molecular-weight polymer by suspension polymerization, and subsequently, producing the high-molecular-weight polymer by suspension polymerizing in the same polymerization system (or first producing the high-molecular-weight polymer by suspension polymerization and then the low-molecular-weight polymer by suspension polymerization in the same polymerization system). This method is superior for producing a uniform mixture of the two polymers, but has the defect that a long period of time is required to produce the high-molecular-weight polymer, and the cost of production becomes high. Furthermore, there is a limit to the molecular weight of the high-molecular-weight polymer which can be produced by a suspension polymerization method, and it is difficult to produce a polymer having a high molecular weight sufficient for the exhibition of good non-offset property. As still another defect, because the polymer obtained by suspension polymerization has a relatively large particle diameter, a long period of time is required to dissolve the polymer particles obtained in the first-step suspension polymerization in a monomer for the second-step suspension polymerization to be subsequently carried out, or at times, the polymer particles obtained in the first step dissolve only non-uniformly in the monomer for the second step. Consequently, the resin finally obtained becomes non-uniform, and the characteristcs of a toner prepared from it become unstable.

It is an object of this invention therefore to provide an improved process for producing easily and within short periods of time a toner resin which can give a toner having a desirable fixing temperature and non-offset property in the development and fixation of a latent electrostatic image in electrophotography.

According to this invention, this object is achieved by a process for producing a resin composition which comprises suspension-polymerizing at least one vinyl monomer in an aqueous medium in the presence of a dispersing agent, said suspension polymerization being carried out using a nonionic dispersant as said dispersing agent in the presence of a high-molecular-weight vinyl polymer having a weight average molecular weight of at least 500,000 obtained by emulsion polymerization.

The process provided by this invention will be described below in detail.

The vinyl monomer to be suspension-polymerized in the process of this invention may be any monomers having ethylenically unsaturated double bonds which have been used heretofore in the preparation of toner resins. Examples include styrenes such as styrene, o-, m- and p-methylstyrenes, alpha-methylstyrene, p-ethylstyrene and p-tert-butylstyrene; vinyl aromatic hydrocarbons such as vinylnaphthalenes; monolefins such as ethylene, propylene, butylene and isobutylene; vinyl halides such as vinyl chloride and vinyl chloride, vinyl esters such as vinyl acetate and vinyl butyrate; ethylenically unsaturated monocarboxylic acids and esters thereof, such as acrylic acid, methyl acrylate, ethyl acrylate, n-butyl acrylate, isobutyl acrylate, n-octyl acrylate, 2-ethylhexyl acrylate, chloroethyl acrylate, methacrylic acid, methyl methacrylate, ethyl methacrylate, n-butyl methacrylate, isobutyl methacrylate, n-octyl methacrylate, dodecyl methacrylate and stearyl methacrylate; ethylenically unsaturated monocarboxylic acid derivatives such as acrylonitrile, methacrylonitrile, acrylamide and methacrylamide; vinyl ethers such as vinyl methyl ether, vinyl ethyl ether and vinyl isobutyl ether; ethylenically unsaturated dicarboxylic acids and derivatives thereof, such as maleic acid, maleic anhydride, dimethyl maleate, diethyl maleate and dibutyl maleate; vinyl ketones such as vinyl methyl ketone and vinyl hexyl ketone; vinylidene halides such as vinylidene chloride and vinylidene chlorofluoride; and N-vinyl nitrogen-containing heterocyclic compounds such as N-vinylpyrrole, N-vinylcarbazole, N-vinyl indole and N-vinyl pyrrolidone. Of these vinyl monomers, styrene, o-, m- and p-methylstyrenes, acrylate esters, methacrylate esters and vinyl acetate are especially preferred.

The above monomers may be used singly or in combination with each other. When two or more of them are to be used in combination, they preferably have compatibility with each other. There is no particular restriction on the types or the mixing ratio of the two or more monomers, and such factors can be varied widely depending upon, for example, the properties required of the final toner.

In the process of this invention, the suspension polymerization of the vinyl monomer is carried out in the presence of a nonionic dispersant. Examples of the nonionic dispersant are polyvinyl alcohol (PVA for short), methyl cellulose, ethyl cellulose, gelatin, and polyethylene oxide (PEO for short). Of these, PVA having a degree of saponification of 80 to 90% and a degree of polymerization of 1,500 to 3,000 and PEO having an average molecular weight of 100,000 to 1,000,000 are preferred. Particularly, the use of a mixture of 100 parts by weight of PVA and 4 to 20 parts by weight of PEO has the advantage that the dispersibility of the mixture is higher than that of each component of the mixture, and a uniform bead-like polymer having a uniform particle diameter can be obtained.

It has not yet been fully elucidated why the use of the nonionic dispersant in the suspension polymerization in accordance with this invention is advantageous. But the fact remains that when the suspension polymerization is carried out by using an anionic or cationic dispersing agent, good dispersibility cannot be obtained in general and the resulting polymer particles are seen to flocculate into a sticky mass, although there is some difference in such results depending upon the type of a surface-active agent that may be included in the high-moleuclar-weight polymer obtained by emulsion polymerization which is to be present in the suspension polymerization medium used in this invention.

The amount of the nonionic dispersant can be varied widely according to the type of the vinyl monomer used, the type or amount of the high-molecular-weight polymer to be present together, etc. Generally, the suitable amount of the nonionic dispersant is 0.2 to 2 parts by weight, especially 0.5 to 1.0 part by weight, per 100 parts by weight in total of the vinyl monomer and the high-molecular-weight vinyl polymer (solids) present in the aqueous medium in which the suspension polymerization is carried out. If the amount of the dispersant is less than 0.2 part by weight, the dispersion stability of the monomer is poor, and the resulting polymer particles are likely to flocculate into a sticky mass. On the other hand, if it exceeds 2 parts by weight, the hygroscopicity of the resin composition becomes high, and this may possibly exert deleterious effects on the charging characterisitics of a toner prepared from the resin composition.

The high-molecular-weight polymer to be present in the aqueous medium during the suspension polymerization in accordance with this invention is a very fine particulate polymer produced by emulsion polymerization which generally has a particle size of 20 to 100 microns. There is no particular limitation to the type of the high-molecular-weight vinyl polymer and it may be of any high-molecular-weight vinyl polymers which are normally used in the field of electrophotography or as adhesives, paints and engineering plastics. For example, there can be used polymers obtained by emulsion-polymerizing at least one vinyl monomer exemplified above for use in suspension polymerization in the presence of an emulsifying agent by an ordinary method so that the resulting polymer has a high molecular weight. The emulsion polymerization may be carried out by using known surfactants of any of the anionic, nonionic and cationic types. Generally, the emulsion polymerization is conveniently carried out by using 0.1 to 5 parts by weight, preferably 0.4 to 2 parts by weight, per 100 parts by weight of the vinyl monomer, of an anionic surfactant such as fatty acid salts, sodium alkylbenzenesulfonates, alkylnaphthalenesulfonic acid salts, dialkylsulfosuccinic acid ester salts, alkylphosphoric acid ester salts, naphthalenesulfonic acid/formalin condensate, and polyoxyethyene alkylsulfuric acid ester salts. If the amount of the emulsifier is less than 0.1 part by weight, the stability of the polymerization system during emulsion polymerization becomes poor, and the resulting polymer particles are liable to flocculate. If it is larger than 5 parts by weight, the stability of the polymerization system during the emulsion polymerization is good. But when the resulting polymer emulsion is used in the suspension polymerization, the particles of the suspension polymerized product tend to become excessively small and dehydration and washing of the polymer may become difficult. Furthermore, the surface active agent cannot be fully removed but remains in the final polymer particles. Hence, the resulting toner resin becomes hygroscopic and the charging characteristics of a toner prepared from the final resin are adversely affected.

The emulsion polymerization can be carried out by a method known per se. For example, it can be carried out by charging a reactor with the emulsifier, a polymerization initiator such as potassium persulfate, ammonium persulfate or 2,2'-azobis(2-aminopropane) hydrochloride and an aqueous medium (usually deionized water), heating these materials to about 50° to about 90° C., and thereafter, adding the vinyl monomer dropwise and polymerizing it.

The high-molecular-weight polymer obtained by emulsion polymerization is an important component which imparts desirable non-offset property to the toner to be finally obtained. It has a weight average molecular weight of at least 500,000, preferably 650,000 to 2,000,000, especially preferably 800,000 to 1,200,000.

The high-molecular-weight polymer to be present in the suspension polymerization system in accordance with this invention may be commercially available polymers supplied to the market. Alternatively, it is possible to produce a high-molecular-weight vinyl polymer emulsion by emulsion polymerization of a vinyl monomer prior to suspension polymerization, subsequently add predetermined amounts of the aqueous medium, the dispersing agent, a vinyl monomer, etc. to the reactor used in the emulsion polymerization, and to perform suspension polymerization in the same reactor.

In the process of this invention, the vinyl monomer used to produce the high-molecular-vinyl polymer need not to be the same as the vinyl monomer component to be suspension-polymerized. Dissimilar monomers may be used according to the properties required of the toner.

The characteristic feature of the process of this invention is to carry out the suspension polymerization of the vinyl monomer in the presence of the high-molecular-weight polymer obtained by emulsion polymerization. The amount of the high-molecular-weight polymer may be varied widely depending upon the type of the high-molecular-weight polymer, the type of the vinyl monomer, and/or the properties required of the toner. Generally, it is conveniently used in such an amount that the weight ratio of the high-molecular-weight polymer to the vinyl monomer is in the range of from 5:95 to 35:65, preferably from 10:90 to 30:70, more preferably from 15:95 to 25:75. If the weight ratio is less than 5:95, the melt viscosity of the resin composition is low, and a toner prepared from it has good fixability. But the offset phenomenon is liable to occur especially at high temperatures. On the other hand, if the weight ratio becomes larger than 35:65, the melt viscosity of the resin composition is high, and a toner prepared from it has good off-set property but may have reduced fixability.

The suspension polymerization itself in this invention is not special and can be carried out by an ordinary method. For example, it can be carried out by adding a predetermined amount of the high-molecular-weight vinyl polymer and a predetermined amount of the vinyl monomer containing a suitable amount of a polymerization initiator for obtaining the desired molecular weight and optionally a molecular weight controlling agent to an aqueous medium in which the nonionic dispersant is dissolved, and heating the mixture with stirring.

Generally, deionized water is used as the aqueous medium for the suspension polymerization. The polymerization initiator may, for example, be benzoyl peroxide, dicumyl peroxide, or alpha, alpha'-azobisisobutyronitrile. Generally, the suitable amount of the polymerization initiator is 1 to 15 parts by weight, preferably 3 to 10 parts by weight, per 100 parts by weight of the vinyl monomer. As required, lauryl mercaptan, n-butylmercaptan, 2-ethylhexylmercaptan, etc. may be used as the molecular weight controlling agent. The molecular weight controlling agent may be used generally in an amount of 0.05 to 5 parts by weight, preferably 0.5 to 3 parts by weight, per 100 parts by weight of the vinyl monomer.

The suspension polymerization can be carried out generally at 60° to 140° C.

Preferably, the suspension polymerization is carried out while controlling the polymerization conditions such that the resulting low-molecular-weight vinyl polymer has a weight average molecular weight of generally 5,000 to 50,000, preferably 8,000 to 40,000, more preferably 10,000 to 30,000. If the molecular weight of the low-molecular-weight polymer is higher than 50,000, a toner prepared from the resulting resin composition does not have sufficient fixability, and therefore the resin composition is unsuitable for preparation of toners. If the molecular weight is less than 5,000, it is difficult to perform the polymerization while strictly controlling the molecular weight within such a low molecualr weight range. Even if such a low-molecular-weight polymer could be produced, a toner prepared from it may have poor durability and undesirable storability.

The molecular weight of the low-molecular-weight polymer in the resin composition obtained by the suspension polymerization is measured by gel permeation chromatography under the following conditions.

Temperature: 35° C.
Solvent: tetrahydrofuran
Sample concentration: 0.2 g/dl
Sample weight: 0.5 mg
Flow rate: 1 ml/min.
Standard sample: NBS polystyrene made by General Science Corporation with an Mw of $19.8 \times 10^4$ and Mn of $7.5 \times 10^4$ The molecular weight of the low-molecular-weight portion of the resin composition obtained by suspension polymerization is the molecular weight, measured in the same way as above, of a polymer obtained by suspension-polymerizing a vinyl monomer under the same conditions as in the foresaid suspension polymerization but in the absence of the high-molecular-weight polymer.

The resin composition obtained by the suspension polymerization described above is dehydrated, repeatedly washed, and dried. The resulting resin composition is suitable for preparation of a colored toner which can be used for developing a latent electrostatic image.

The resin composition produced by the process of this invention described above has a number average molecular weight (Mn) of generally 5,000 to 30,000, preferably 8,000 to 20,000, a weight average molecular weight (Mw) of generally 50,000 to 400,000, preferably 100,000 to 300,000, and a glass transition temperature (Tg) of generally 40° to 90° C., preferably 60° to 80° C.

According to the process of this invention, the high-molecular-weight vinyl polymer which gives desirable non-offset property to a toner is supplied in the form of an emulsion, and in the presence of the high-molecular-weight vinyl polymer, the low-molecular-weight vinyl polymer which imparts desirable fixability to the toner is produced by the suspension polymerization of the vinyl monomer. Accordingly, even when there is a marked difference in molecular weight between the high-molecular-weight vinyl polymer and the low-molecular-weight vinyl polymer, a uniform mixture of the polymers can be produced very easily within a short period of time. Furthermore, in spite of using the particulate emulsion polymer as one component, the mixed polymer obtained is a bead-like polymer having a relatively large particle diameter. The mixed polymer therefore lends itself to easy handling in after-treatment steps such as dehydration and washing.

A toner may be prepared from the resulting resin composition by methods known per se. For example, 100 parts by weight of the resulting resin composition is added to 2 to 300 parts by weight of an ordinary coloring agent (for example, inorganic pigments such as carbon black and tri-iron tetroxide, or organic pigments such as nigrosine base or aniline black). They are fully kneaded, and pulverized to the desired particle diameter (5 to 30 microns, preferably 10 to 20 microns). Alternatively, the coloring agent is added to a solution of the resin composition and fully dispersed. The dispersion is then dried, for example, by a spray drying technique.

The mixing ratio of the resin composition to the coloring agent is suitably in the range of 100:2-300. It is advanageously 100:3-7 for an ordinary toner containing a carrier, and 100:150-200 for a carrierless toner.

The toner as obtained has good non-offset property and low-temperature fixability. As required, ordinary additives such as a charge controlling agent (e.g., neutral red, Nile blue), a lubricant (e.g., colloidal silica, metal stearates), or an offset-preventing agent (e.g., polyethylene wax, cadmium stearate) may be incorporated into the toner in the amounts ordinarily used. For example, the charge controlling agent may be added in an amount of not more than 3 parts by weight per 100 part by weight of the resin composition, and the amount of the offset preventing agent is 0.1 to 10 parts by weight.

The following Examples illustrate the present invention more specifically. In these examples, all parts are by weight.

EXAMPLE 1

A. Production of a high-molecular-weight polymer emulsion

A 1-liter separable flask was charged with 0.4 part of Pelex OTP (sodiumn dialkylsulfosuccinate, a product of Kao Soap Co., Ltd.), 0.04 part of $K_2S_2O_8$ and 60 parts of distilled water, and they were dissolved. While maintaining the inside of the flask at 80° C., a monomeric mixture of 32 parts of styrene and 8 parts of butyl acrylate (to be abbreviated as BA) was added dropwise over 3 hours and polymerized. The temperature was then elevated to 90° C., and the reaction mixture was maintained at this temperature for 1 hour to complete the emulsion polymerization. The resulting polymer emulsion (to be referred to as emulsion A) had a solids content of 39.8%, and the polymer had a weight average molecular weight Mw) of $80.1 \times 10^4$.

B. Production of a polymer by suspension polymerization

A 1-liter separable flask was charged with 0.6 part of a nonionic dispersant (Gohsenol GH-23, partially saponified PVA having a degree of saponification of 86.5% and a degree of polymerization of 2300 produced by Nihon Gosei Kagaku Kogyo K. K.), and it was dissolved in 150 parts of distilled water. Then, 25 parts (10 parts as solids) of the emulsion A was added. Subsequently, a separately prepared monomer component composed of a solution of 2.7 parts of benzoyl peroxide (to be abbreviated BPO) in 72 parts of styrene and 18 parts of BA was added and dispersed.

When the contents of the flask were heated to 90° C., an increase in viscosity was observed in the polymerization during the course of elevating the temperature. In about 10 to 20 minutes after the temperature reached 90° C., the viscosity decreased and a stable suspension formed. The suspension was maintained at this temperature for 3 hours to complete the polymerization. The contents of the flask were then cooled. The solid was separated, dehydrated, repeatedly washed, and dried to obtain a polymer composition of high uniformity consisting of a high-molecular-weight portion and a low-molecular-weight portion. The resulting polymer had an Mw of $11.3 \times 10^4$, an Mn of $2.0 \times 10^4$, and a glass transition point (Tg) of 68° C. The low-molecular-weight portion of this polymer had an Mw of $3.4 \times 10^4$ and an Mn of $1.8 \times 10^4$.

C. Production of a toner and evaluation of its properties

The polymer obtained in B above (95 parts), 5 parts of carbon black and 4 parts of a charge controlling agent (Zapon Fast Black B, a product of BASF, CI 12195) were preliminarily dispersed by a Henschel mixer (a product of Mitsui Miike Seisakusho) and hot kneaded by a twin-screw kneader extruder (a product of Ikegai Tekko Co., Ltd.). The mixture was cooled and finely pulverized by a jet mill (a product of Nippon Pneumatic Industry Co., Ltd.) and classified by an air classifier (a product of Nippon Pneumatic Industry Co., Ltd.) to form a toner having an average particle diameter of 12 microns. The toner (10 parts) was mixed with 90 parts of an iron powder carrier (TEFV 250/400, a product of Nippon Teppun Co., Ltd.) to prepare a developer. A latent electrostatic image is formed by an ordinary electrophotographic copying process by an electrophotographic copying machine (DC-191 made by Mita Industrial Co., Ltd.), and the toner image was transferred to a plain paper sheet. The properties of the toner were evaluated by the following testing methods (1) and (2).

The results are shown in Table 6 below.

(1) Lower limit of the fixation temperature and the offset temperature

The above receptor sheet having the toner image transferred thereto was passed through a fixing roll whose surface was formed of Teflon and a press roll whose surface was formed of silicone rubber. The fixation was carried out at varying temperatures of the fixing roll. The lower limit of the fixation temperature and the temperature at which offset occurred (offset temperature) were measured.

(2) Quality of the image

Fogging, sharpness, resolving power, running of characters (like blurring), and missing of thick characters (formation of white spots on the solid portion by failure of toner adhesion), etc. were evaluated comprehensively.

COMPARATIVE EXAMPLE 1

The emulsion A prepared in Example 1, A was salted out to separate the high-molecular-weight vinyl polymer. Separately, the suspension polymerization in Example 1, B was carried out without using the emulsion A to obtain a low-molecular-weight vinyl polymer. The above high-molecular-weight vinyl polymer and the low-molecular-weight vinyl polymer were kneaded in the molten state at a temperature of 150° C. The low-molecular-weight polymer melted and attained a low viscosity, whereas the high-molecular-weight polymer was insoluble. The two polymers could not be mixed uniformly.

COMPARATIVE EXAMPLE 2

A 1-liter separable flask was charged with 0.1 part of Gohsenol GH-17 (PVA having a degree of saponification of 87% and a degree of polymerization of 1800, a product of Nihon Gosei Kagaku Kogyo K.K.), and it was dissolved in 100 parts of distilled water. A monomer component composed of 0.04 part of BPO, 16 parts of styrene and 4 parts of BA was added and dispersed in the solution. The dispersion was then maintained at 80° C. for 15 hours to perform a first-step suspension polymerization for the production of a high-molecular-weight vinyl polymer. The polymerization system was cooled to 40° C., and a monomer component composed of 3.2 parts of BPO, 64 parts of styrene and 16 parts of BA was added. The mixture was stirred at 40° C. for 2 hours. Then, 100 parts of distilled water having 0.4 part of Gohsenol GH-17 dissolved in it was added dropwise. The mixture was maintained at 90° C. for 3 hours to perfom a second-step suspension polymerization for the production of a low-molecular-weight vinyl polymer. The product was worked up in the same way as in Example 1 to form a mixed polymer.

The mixed polymer had a Tg of 67° C., an Mw of 9.2×10⁴, and an Mw/Mn of 8.2. The high-molecular-weight vinyl polymer had an Mw of only 38.1×10⁴ at the highest in spite of the fact that the polymerization was carried out for as long as 15 hours. As shown in Table 6, a toner prepared from this mixed polymer showed an offset temperature of as low as 190° C., and an image developed with the toner was susceptible to fogging.

EXAMPLES 2-3 AND COMPARATIVE EXAMPLE 3

Suspension polymerization was carried out in accordance with the recipes shown in Table 1 below in the same way as in Example 1 using the emulsion A prepared in Example 1.

TABLE 1

| Components | Example 2 | Example 3 | Comparative Example 3 |
|---|---|---|---|
| Emulsion A | 25 | 25 | 25 |
| Gohsenol GH-23 | 3 | 0.1 | — |
| Calcium phosphate | — | — | 2 |
| Distilled water | 150 | 150 | 150 |
| Monomer component (*) | 92.7 | 92.7 | 92.7 |

(*) The monomeric component had the same composition as that used in Example 1.

The size of the polymer particles obtained by suspension polymerization in Example 2 was just a little bit too small because as much as 3 parts of the nonionic dispersant was used per 100 parts in total of the emulsion polymer and the monomer, and consisted of particles of non-uniform sizes. The final polymer had an Mw of 10.8×10⁴, an Mn of 2.1×10⁴, and a Tg of 67° C. As shown in Table 6, the quality of the image (fogging) attributed to the charging characteristics of the toner was slightly unstable. But the lower limit of the fixing temperature is low, and the offset temperature was high.

On the other hand, the polymer obtained by suspension polymerization in Example 3 gave a slightly unstable dispersion and some flocculated matter was observed because the amount of the nonionnic dispersant was decreased. The characteristics of the toner, however, were the same as in Example 1, as Table 6 indicates.

In Comparative Example 3, no nonionic dispersant was used during the suspension polymerization. Accordingly, the polymerization system became a sticky mass during the heating of the contents of the flask to 90° C. or within 30 minutes after a temperature of 90° C. was reached. The polymerization product therefore could not be taken out as suspended particles. The same phenomenon was observed when poly(sodium methacrylate) was used as the dispersing agent.

EXAMPLES 4-7

A. Producton of a high-molecular-weight polymer emulsion

High-molecular-weight vinyl polymer emulsions B, C, D and E having different molecular weights were produced in the same way as in Example 1 in accordance with the recipes shown in Table 2. The solids contents of the emulsions and the Mw of the polymers were measured, and the results are shown in Table 2.

TABLE 2

| Components | Emulsion B | C | D | E |
|---|---|---|---|---|
| Pelex OTP | 0.4 | 0.6 | — | 0.4 |
| Sodium dodecyl-benzenesulfonate | — | — | 0.3 | — |
| K₂S₂O₈ | 0.06 | 0.01 | 0.03 | 0.1 |
| Distilled water | 60 | 60 | 60 | 60 |
| Styrene | 32 | 32 | 24 | 32 |
| MMA (*1) | — | — | 10 | — |
| BA | 8 | 8 | — | 8 |
| 2-EHA (*2) | — | — | 6 | — |
| Solids content (%) | 40.1 | 38.7 | 39.6 | 39.7 |
| Mw (× 10⁴) | 68.3 | 142.3 | 101.2 | 38 |

(*1) Methyl macharylatte
(*2) 2-Ethylhexyl acrylate

B. Production of a polymer by suspension polymerization

A polymer was produced by suspension polymerization in the same way as in Example 1 in accordance with the recipes shown in Table 3 using each of the polymer emulsions produced in accordance with the recipes shown in Table 2, and PEO of Meisei Chemical Industry Co., Ltd. (Alkox E-30 having a molecular weight of 400,000 and Alkox R-1000 having a molecular weight of 200,000) and Gohsenol GH-23 as a nonionic dispersant.

TABLE 3

| Components | Example 4 | 5 | 6 | 7 |
|---|---|---|---|---|
| Emulsion used | B (25) | C (25) | D (25) | E (25) |
| Alkox E-30 | 0.3 | — | — | — |
| Alkox R-1000 | — | 0.1 | — | — |
| Gohsenol GH-23 | — | 0.6 | 0.6 | 0.6 |
| Distilled water | 180 | 150 | 150 | 150 |
| Monomer component (*) | 92.7 | 92.7 | 92.7 | 92.7 |
| Tg (°C.) | 69 | 68 | 70 | 68 |
| Mw (× 10⁴) | 8.7 | 15.4 | 13.2 | 6.8 |
| Mn (× 10⁴) | 2.1 | 2.3 | 2.1 | 2.1 |

(*1): The monomer had the same composition as the monomer component used in Example 1.

With any of the recipes in Examples 4 to 7, the suspension polymerization could be performed while maintaining a very good dispersed state, and polymers in the form of uniform bead-like particles were obtained.

A toner prepared by using the final polymer obtained in Example 7 showed an offset temperature of 170° C. which was slightly lower because the vinyl polymer having a relatively low molecular weight was used. Toners obtained from the polymers prepared in Examples 4 to 6 showed higher offset temperatures as the molecular weight of the high-molecular-weight polymer emulsion increased, as shown in Table 6 below.

EXAMPLES 8-11

Low-molecular-weight vinyl polymers having different molecular weights were produced by suspension polymerization in the same way as in Example 1 in accordance with the recipes shown in Table 4 using the polymer emulsion C obtained in the above Example, and PEO of Meisei Kagaku Kogyo K. K. (Alkox E-60 having a molecular weight of 1,100,000 or Alkox R-400 having a molecular weight of 150,000) or Gohsenol as a nonionic dispersing agent (in Example 11, the suspension polymerization was carried out at 130° C. for 30 minutes).

TABLE 4

| Components | Example 8 | 9 | 10 | 11 |
|---|---|---|---|---|
| Emulsion C | 50 | 50 | 50 | 50 |
| Alkox E-60 | 0.3 | 0.3 | 0.3 | — |
| Alkox R-400 | — | — | — | 0.1 |
| Gohsenol GH-23 | — | — | — | 0.6 |
| Distilled water | 150 | 150 | 150 | 150 |
| Styrene | 56 | 58 | 60 | 71 |
| MMA | 8 | 8 | 8 | — |
| BA | 16 | 14 | 12 | 9 |
| BPO | 2.4 | 4 | 5.6 | 8 |
| Tg (°C.) | 68 | 67 | 66 | 67 |
| Mw ($\times 10^4$) | 38.3 | 31.5 | 27.4 | 24.2 |
| Mn ($\times 10^4$) | 2.4 | 1.7 | 1.2 | 0.51 |
| Mw ($\times 10^4$) of the low-molecular-weight portion | 3.5 | 2.4 | 1.8 | 0.8 |

In accordance with any of the recipes of Examples 8 to 11, polymers in the form of uniform beads could be produced easily, and the characteristics of toners prepared from the polymers were excellent. As shown in Table 6, the lower limit of the fixing temperature became lower as the molecular weight of the low-molecular-weight polymer decreased, and yet the offset temperature was high.

EXAMPLES 12–15

A. Production of a high-molecular-weight polymer emulsion

A high-molecular weight vinyl polymer emulsion F (solids content 39.1%; Mw $105.8 \times 10^4$) was produced in the same way as in Example 1 by using 0.03 part of $K_2S_2O_8$, 0.4 part of alkylnaphthalenesulfonate salt, 60 parts of distilled water, 25 parts of styrene, 5 parts of MMA and 10 parts of n-BMA.

Likewise, an emulsion G (Mw $120.3 \times 10^4$) was produced by using 0.02 part of $K_2S_2O_8$, 0.4 part of Pelex OTP, 60 parts of distilled water, 16 parts of styrene and 4 parts of BA.

B. Production of a polymer by suspension polymerization

Suspension polymerization was carried out in the same way as in Example 1 in accordance with the recipes shown in Table 5 using the emulsions A, F and G.

TABLE 5

| Components | Example 12 | 13 | 14 | 15 |
|---|---|---|---|---|
| Emulsion used | F (15) | F (75) | G (80) | A (100) |
| Gohsenol GH-17 | 0.6 | 0.6 | — | — |
| Gohsenol GH-23 | — | — | 0.6 | 0.6 |
| Alkox R-1000 | 0.08 | 0.08 | — | — |
| Distilled water | 180 | 180 | 150 | 150 |
| Styrene | 60 | 30 | 64 | 48 |
| MMA | 8 | 10 | — | — |
| n-BMA | 26 | 30 | — | — |
| BA | — | — | 16 | 12 |
| BPO | 3.1 | 2.3 | 3.2 | 1.8 |
| Tg (°C.) | 71 | 68 | 68 | 70 |
| Mw ($\times 10^4$) | 11.2 | 48.1 | 30.4 | 50.3 |
| Mn ($\times 10^4$) | 2.3 | 2.8 | 2.1 | 3.2 |
| Mw ($\times 10^4$) of the low-molecular-weight portion | 3.8 | 3.7 | 3.4 | 3.4 |

In accordance with any of the recipes of Examples 12 to 15 in which the mixing ratio between the high-molecular-weight polymer and the low-molecular-weight polymer was different, uniform bead-like resins could be easily produced. Toners prepared by using the resins obtained in the same way as in Example 1 from the polymers obtained in Examples 12 to 14 had excellent characteristics as shown in Table 6. With a toner prepared from the polymer obtained in Example 15, the offset temperature rose because the proportion of the high-molecular-weight polymer portion was relatively large. With it, however, the lower limit of the fixing temperature also rose, and the results were not entirely good. But the quality of the image was good, and the toner can be used in practical application.

EXAMPLE 16

A high-molecular-weight vinyl polymer emulsion (Mw = $76.3 \times 10^4$) was produced by the same method as in Example 1 except that 2.8 parts (7% based on the vinyl monomer) of Pelex OTP was used as the emulsifier. Then, suspension polymerization was carried out using the high-molecular-weight vinyl polymer.

Presumably becasuse the emulsifier was used in a relatively large amount in the emulsion polymerization, the polymer obtained by suspension polymerization was in the form of beads containing slightly finer particles with non-uniform sizes. Longer periods of time were required for washing and dehydration. But the resin obtained had an Mw of $10.5 \times 10^4$, an Mn of $2.1 \times 10^4$, and a Tg of 67° C., and the characteristics of a toner prepared from the resin were good on the whole as shown in Table 6.

EXAMPLE 17

The same suspension polymerization as in Example 1 was carried out except that the amount of BPO was changed to 1.26 parts. The resulting polymer had a Tg of 69° C., an Mw of $16.4 \times 10^4$ and an Mn of $3.3 \times 10^4$, and the low-molecular-weight portion of the polymer had an Mw of $6.1 \times 10^4$. The lower limit of the fixing temperature of a toner prepared from the resulting polymer was 150° C. which was slightly higher presumably because the the Mw of the low-molecular-weight portion was relatively large. But as shown in Table 6, other toner characteristics were good.

TABLE 6

| Example | Mw ($\times 10^4$) of the high-molecular-weight polymer | Parts of the high-molecular-weight portion/ parts of the low-molecular-weight portion | Mw ($\times 10^4$) of the low-molecular-weight polymer | Parts of the non-ionic dispersant per 100 parts of monomer plus polymer | Lower limit of the fixing temperature (°C.) | Off set temperature (°C.) | Image quality (*2) |
|---|---|---|---|---|---|---|---|
| 1 | 80.1 | 10/90 | 3.4 | 0.6 | 125 | 210 | |
| 2 | " | " | " | 3.0 | 130 | 215 | Δ |
| 3 | " | " | " | 0.1 | 125 | 210 | |

TABLE 6-continued

| Example | Mw (× 10⁴) of the high-molecular-weight polymer | Parts of the high-molecular-weight portion/ parts of the low-molecular-weight portion | Mw (× 10⁴) of the low-molecular-weight polymer | Parts of the non-ionic dispersant per 100 parts of monomer plus polymer | Lower limit of the fixing temperature (°C.) | Off set temperature (°C.) | Image quality (*2) |
|---|---|---|---|---|---|---|---|
| 4 | 68.3 | " | " | 0.3 | " | 200 | |
| 5 | 142.3 | " | " | 0.7 | 130 | 230 | |
| 6 | 101.2 | " | " | 0.6 | " | 225 | |
| 7 | 38 | " | " | 0.6 | 135 | 170 | Δ |
| 8 | 142.3 | 20/80 | " | 0.3 | 130 | 230 | |
| 9 | " | " | 2.4 | " | 125 | 225 | |
| 10 | " | " | 1.8 | " | 120 | 220 | |
| 11 | " | " | 0.8 | 0.7 | 115 | 235 | |
| 12 | 105.8 | 6/94 | 3.8 | 0.68 | 120 | 195 | |
| 13 | " | 30/70 | 3.7 | " | 125 | 240 | |
| 14 | 120.3 | 20/80 | 3.4 | 0.6 | 120 | " | |
| 15 | 80.1 | 40/60 | " | " | 170 | 250 | Δ |
| 16 | 76.3 | 10/90 | " | " | 125 | 210 | Δ |
| 17 | 80.1 | " | 6.1 | " | 150 | " | Δ |
| 2(*1) | 38.1 | 20/80 | 3.4 | 0.6 | 135 | 190 | Δ |

(*1): Comparative Example 2
(*2): Standards of evaluation of the image quality were as follows:
 : The copy had excellent sharpness and resolution without any fogging, running of characters and missing of thick characters.
 : The copy had excellent sharpness and resolution with scarcely any fogging, running of characters, and missing of thick characters.
Δ : The copy had good sharpness although fogging, running of characters, and missing of thick characters are observed in the copy to such degrees as not to be detrimental to practical use.
Δ: The copy had generally good sharpness and resolution. Although fogging and other imperfections are observed in the copy, they do not impair the practical utility of the copy.

What is claimed is:

1. A process for producing a resin composition comprising a low-molecular-weight vinyl polymer having a weight average molecular weight of 5,000 to 50,000 and a high-molecular-weight vinyl polymer having a weight average molecular weight of at least 500,000 which comprises separately mixing at least one vinyl monomer and an emulsion of said high-molecular-weight vinyl polymer in any desirable sequence with an aqueous medium containing 0.2 to 2 parts by weight, per 100 parts by weight in total of said vinyl monomer and said high-molecular-weight vinyl polmer, of a nonionic dispersant, the weight ratio of said high-molecular-weight vinyl polymer to vinyl monomer being in the range of from 5:95 to 35:65 and said emulsion being obtained by emulsion polymerization of at least one vinyl monomer in the presence of 0.1 to 5 parts by weight, per 100 parts by weight of the vinyl monomer, of an emulsifying agent; and suspension-polymerizing said vinyl monomer in the presence of said high-molecular-weight vinyl polymer to produce said low-molecular-weight polymer.

2. The process of claim 1 wherein the nonionic dispersant is selected from the group consisting of polyvinyl alcohol having a degree of saponification of 80 to 90% and a degree of polymerization of 1,500 to 3,000, polyethylene oxide having an average molecular weight of 100,000 to 1,000,000, and a mixture of these.

3. The process of claim 2 wherein the nonionic dispersant is a mixture of 100 parts by weight of polyvinyl alcohol and 4 to 20 parts by weight of polyethylene oxide.

4. The process of claim 1 wherein the high-molecular-weight vinyl polymer has a weight average molecular weight of 650,000 to 2,000,000.

5. The process of claim 1 wherein the weight ratio of the high-molecular-weight vinyl polymer to the vinyl monomer is in the range of from 10:90 to 30:70.

6. The process of claim 1 wherein the vinyl monomer is selected from the group consistng of o-, m- and p-methylstyrenes, acrylic acid esters, methacrylic acid esters and vinyl acetate.

* * * * *